United States Patent [19]
Baer

[11] Patent Number: 5,316,872
[45] Date of Patent: May 31, 1994

[54] PASSIVE COOLING SYSTEM

[75] Inventor: Stephen C. Baer, Albuquerque, N. Mex.

[73] Assignee: Zomeworks Corporation, Albuquerque, N. Mex.

[21] Appl. No.: 984,746

[22] Filed: Dec. 3, 1992

[51] Int. Cl.$^5$ .......................................... H01M 10/50
[52] U.S. Cl. ..................................... 429/62; 429/120; 429/50
[58] Field of Search ........................ 429/120, 50, 62; 165/46, 47, 904

[56] References Cited

U.S. PATENT DOCUMENTS 4,913,985  4/1990  Baer et al. ............................ 429/120

OTHER PUBLICATIONS

Ho-Ming Yeh and Chi-Chien Tseng, "A Thermosyphon Water Cooler With a Parallel, Flat-Plate Radiator", *Energy*, vol. 15, No. 12, pp. 1129–1130, 1990.

Page 18, "Installation Manual DSDP Divisione Sistemi Difesa e Progettazoni", Milan, Italy, 1990.

*Primary Examiner*—C. Warren Ivy
*Assistant Examiner*—D. Margaret M. Mach
*Attorney, Agent, or Firm*—Townsend and Townsend Khourie and Crew

[57] ABSTRACT

The invention provides apparatus for controlling the ambient temperature of an enclosure for containing temperature-sensitive equipment utilizing a quantity of water. A water container is located inside the enclosure. A generally flat, hollow radiator is provided in a nearly horizontal configuration proximate and exterior to the enclosure above the level of the upper end of the water container. The radiator has an exposed upper surface adapted to radiate heat into the atmosphere. A pair of symmetric conduits provide a pair of parallel flow paths from spaced apart container entry/exit positions proximate the upper end of the water container to spaced apart radiator entry/exit positions in the radiator.

23 Claims, 3 Drawing Sheets

PASSIVE COOLING SYSTEM

BACKGROUND OF THE INVENTION

The present invention relates to apparatus for controlling the ambient temperature of an enclosure.

Temperature-sensitive equipment such as batteries, fibre-optic cable connectors and the like, are often utilized in remote locations where they can be subject to temperature extremes which seriously degrade their performance and reliability. Also, livestock and poultry are often confined in areas subject to temperature extremes which may be fatal, even when a form of shutter is provided. It is often important to control the ambient temperature in enclosures or shelters for temperature-sensitive equipment and animals in a passive fashion because electrical power for conventional heating and cooling systems is often expensive or unavailable.

In U.S. Pat. No. 4,913,985, a passive temperature regulation system for batteries and other electric equipment is disclosed. The system employs a housing including a water container, a radiator built into the upper surface of the housing, and a pair of conduits for circulating the water from the container through the housing. The radiator is slightly inclined, and one of the conduits passes from near the bottom of the water container to the lower edge of the radiator, while the other conduit passes from near the top of the container to near the upper edge of the radiator. The radiator and conduits form a thermal siphon at night so that water is drawn upwardly into the radiator through the second conduit from near the top of the radiator, flows downwardly through the radiator and back through the first conduit to the bottom of the water container. The relatively warm water is cooled by radiation as it passes through the radiator to provide a cool atmosphere for the temperature-sensitive equipment located in the enclosure.

It has been found in practice that Nature seems ungrateful for this perfect thermosyphon arrangement, for the system of U.S. Pat. No. 4,913,985 occasionally runs in reverse. Instead of warm water rising from tank top to radiator top and cooled water descending from bottom to bottom, cool water is drawn from the bottom of the tank and cold water returns to the top. Suffering from back flow, the warmest water in the tank stagnates, and the coolest water in the radiator stagnates below their outlets. The temperature differences, and consequently flow and performance, are greatly reduced.

Despite the poor performance, reverse flow, once begun, may persist all night. Daytime heating of the radiator will stop all flow, but the following evening circulation begins again forward or in reverse, depending on minute differences in conditions difficult to predict. In essence, the system may on occasion "lock up" and not perform as designed. The failure of the system to consistently dissipate heat at night will result in undesirable heating within the container, perhaps damaging the temperature-sensitive equipment and degrading the overall reliability of the system.

SUMMARY OF THE INVENTION

Apparatus for controlling the ambient temperature of an enclosure is disclosed. A water container filled with a quantity of water is located inside the enclosure. A generally flat, hollow radiator is provided having a nearly horizontal configuration proximate and exterior to the enclosure above the level of the upper end of the water container. The radiator has an exposed upper surface adapted to radiate heat into the atmosphere. A pair of conduits provide a pair of flow paths from spaced apart container entry/exit positions proximate the upper end of the water container to spaced apart radiator entry/exit positions in the radiator.

The radiator and the pair of conduits in combination act as a thermal siphon when the water temperature in the container is above about 45° F. and is sufficiently warm relative to the temperature of the water in the radiator. Under such circumstances, which typically occur at night, the relatively warm water in the top of the container is circulated upwardly through one of the conduits to one of the entry/exit positions in the radiator. The water passes through the radiator to the other radiator entry/exit position, during which the water is cooled by dissipating heat into the atmosphere through the upper surface of the radiator. The cooled water flows downwardly through the other conduit to the container, where the relatively cooler water returning from the radiator sinks to the bottom to cool the interior of the housing.

Water rising from the top of the tank must be lighter than water returning from the radiator. The difference in density drives the circulation. During warm weather, warm water rises, cool sinks. In cold weather a strange phenomenon occurs: as water cools below 39° F. (4° C.), it expands, becoming less dense. Water at 45° F. rising to a radiator to cool and return at 40° F. will cease to flow if it should cool to 33° F. At 33° F. water has the same density as at 45° F. and thus will not thermosyphon. Water at 39° F. will sink from the radiator and water at 33° F. will rise under some conditions, one instance when nature has heat fall instead of rise.

Thermosyphon flow also slows because viscosity increases at lower temperatures and finally ice forms. This inhibits the interior of the enclosure from being further cooled when the temperature is already less than 45°, i.e., when the ambient environment is quite cold and heat loss would be undesirable. Further, water does not circulate when the radiator is being warmed by the sun to inhibit heating of the interior of the container during the day time.

The configuration of the conduits and the manner in which water circulates through the radiator in the present invention differs from that disclosed in U.S. Pat. No. 4,913,985. Rather than have one conduit configured to be a water supply conduit, and one conduit configured to be a water return conduit to a plenum-style radiator, the system of the present invention provides two parallel conduits which are essentially the same and which are symmetrically arranged in the apparatus. This symmetrical plumbing arrangement reduces reverse flow effects and enhances flow performance. When the conditions are such that circulation of the water through the radiator is appropriate, i.e., when the water in the container is above 45° F. and is sufficiently warm relative to the temperature of the water in the radiator, water will begin to flow up one of the conduits, through the slightly tilted plenum-style radiator, and down the other conduit, with the flow direction determined by local effects such as eddies, localized heating and the like. All mechanical and most fluid motions can be reversed, but not fluid flowing into or out of a pipe. We can blow out a match from 14" but in reverse cannot suck out the same match even from 3".

Every evening, unpredictable, random behavior influences the night's direction of circulation. To make both directions satisfactory, the plumbing must cater to the departing liquid. If we want warm water to leave a tank, then both conduits attach to the top, where warm water accumulates. To get cold from the radiator, we attach the conduits to the bottom. Liquid arriving is not as helpless as that departing; it finds its way naturally by forming a plume, which rises or sinks to its own temperature level according to density. The coherence of a plume can even be enhanced by a cross-perforated tube.

In one embodiment of the present invention, the radiator comprises two or more elongate elements spaced above the upper surface of the enclosure, interconnected at one end so that water can flow serially through one radiator element and then through the other. Parallel conduits connect the other ends of the radiator elements to a water container within the enclosure. This allows the system of the present invention to be utilized in structures in which the radiator is not an integral part of the upper surface of the enclosure.

The novel features which are characteristic of the invention, as to organization and method of operation, together with further objects and advantages thereof will be better understood from the following description considered in connection with the accompanying drawings in which preferred embodiment of the invention are illustrated by way of example. It is to be expressly understood, however, that the description and drawings are for the purpose of illustration and description only and are not intended as a definition of the limits of the invention.

DESCRIPTION OF THE PREFERRED EMBODIMENT

Figure 1:
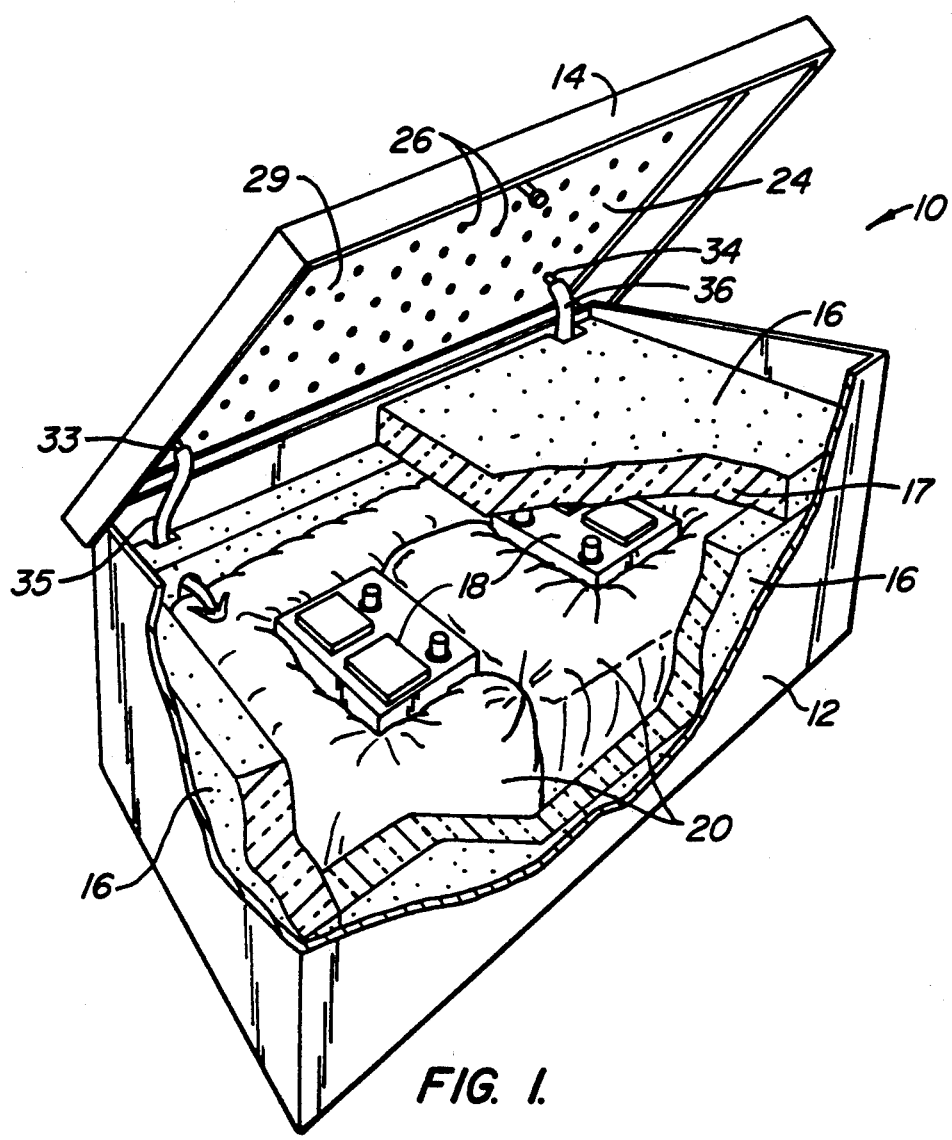
FIG. 1 is a perspective view of a preferred embodiment of the present invention with the lid raised.

The first embodiment 10 of the present invention includes a metal box 12 open at the top, and a lid 14 pivotable about one edge to open and close the box. A heavy gauge steel is used or other appropriate material to construct box 12 and lid 14 so that the contents are protected from the elements. A plurality of insulation panels 16 are located within the box to define an interior cavity 17. Insulation panels 16 limit the heat transferred into an out of the interior cavity 17 of box 12 to inhibit short term changes in internal temperature, i.e., excessive heating of the cavity 17 during the daytime and excessive cooling of cavity 17 at night.

Electrical equipment such as a pair of batteries 18 is located within the interior cavity 17 of box 12. A water container 20 of flexible plastic material circumscribes batteries 18, and is in intimate contact with the batteries to facilitate thermal transfer when the container is filled with water. Alternatively, flexible plastic container 20 can be deleted, in which event cavity 17 formed by insulation 16 provides a container for water which can be used for passive cooling.

Figure 2:
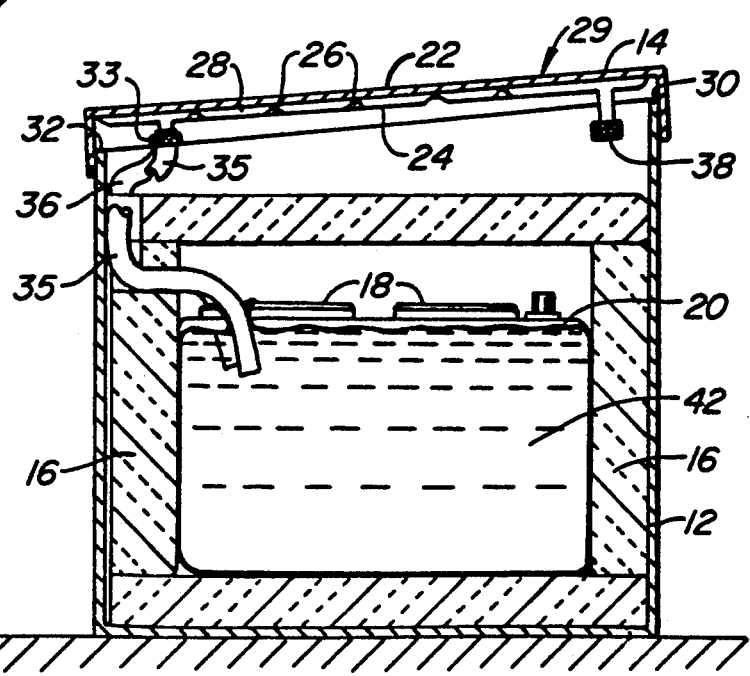
FIG. 2 is a side section view of the first embodiment with the lid closed.

As illustrated in FIG. 2, the lid 14 of embodiment 10 includes an outer steel plate 22, and an inner plate 24. Plate 24 has a plurality of dimples 26 which space plate 24 from plate 22. Plates 22, 24 are epoxied, welded, soldered or otherwise attached around their periphery to provide internal cavity 28, which forms a radiator 29. The upper surface of plate 22 is painted to provide an emissive surface through which heat can be dissipated to the atmosphere. The upper edge 30 of the forward portion of box 12 is higher than the upper edge 32 of the rear of the box, giving the lid 14 and radiator 29 a configuration slightly inclined from horizontal, as illustrated.

A pair of spaced apart fittings 33, 34 are located at opposite sides of the lower end of plate 24 of radiator 29. A pair of conduits 35, 36 are attached to respective fittings 33, 34 and penetrate into water container 20, terminating proximate the upper end of the water container. Conduits 35, 36 are functionally identical and are located at opposite sides of the radiator. A fill port 38 is located in plate 24 so that the hollow interior 28 of the radiator, conduits 35, 36 and water container 20 can be filled with water.

The radiator 29 provided by plates 24, 26 and conduits 35, 36 acts as a thermal siphon when the temperature of the water 42 in water container 20 is above 45° F., and is sufficiently warm relative to the temperature of the water in radiator 29. Assuming that the water is above 45° F., warm water will tend to rise relative to cooler water because it is less dense, meaning that an upward pressure will be exerted on the water in conduits 35, 36 to force the relatively warmer water upwardly through the conduits into radiator 29. Because the water 42 is incompressible, it cannot flow upwardly in both conduits at the same time. Local factors such eddy currents and localized heating will decide the direction of circulation at the onset of thermosyphon each night, causing the water to flow up through one of the conduits 35, 36, through the radiator, and down through the remaining conduit.

Passage of the relatively warm water through radiator 29 will cool the water by dissipating heat through the upper exposed, generally horizontal surface of plate 22. The water will fan out and occupy the entire radiator as it passes through space 28 from one of the fittings 33, 34, to the other fitting. The water that returns to water container 20 is thus cooler than the water at the upper end of the container, and this water will plunge to the bottom in a plume because of its greater density. As the relatively warm water near the top of water container 20 is cooled by the radiator, and returns to the bottom of the water container, the overall temperature of the water in the container will decrease. Thus, the interior of box 12 will be cooled, typically at night, unless the water temperature is about 45° F. or below. In other words, the system of the present invention will typically cool the interior cavity 17 of box 12 at night if the internal temperature is greater than about 45° F.

When the upper plate 22 of box 12 is heated by the sun, the water in radiator 29 will be heated, making the temperature of the water in that space warmer than the temperature of the water in water container 20. Since heated water tends to rise above 45° F. because it is less dense than cooler water, the water in the system will not circulate when the top of the box is receiving solar energy, limiting unwanted heating of the contents in the interior. Moreover, when the temperature of the water in container 20 is less than 45°, the water in the system will also not circulate, meaning that the interior of box 12 will not be excessively cooled when it is already at a relatively cool temperature. In this latter situation, water 42 provides substantial thermal mass that will greatly inhibit unwanted decreases in temperature within box 12, particularly at 32° F. at which point further cooling is prevented as the water gives up its latent heat until the water is completely frozen. Where freezing is possible the container 20 must be of a rectangular or other form able to flex when its contents expand.

Figure 3:
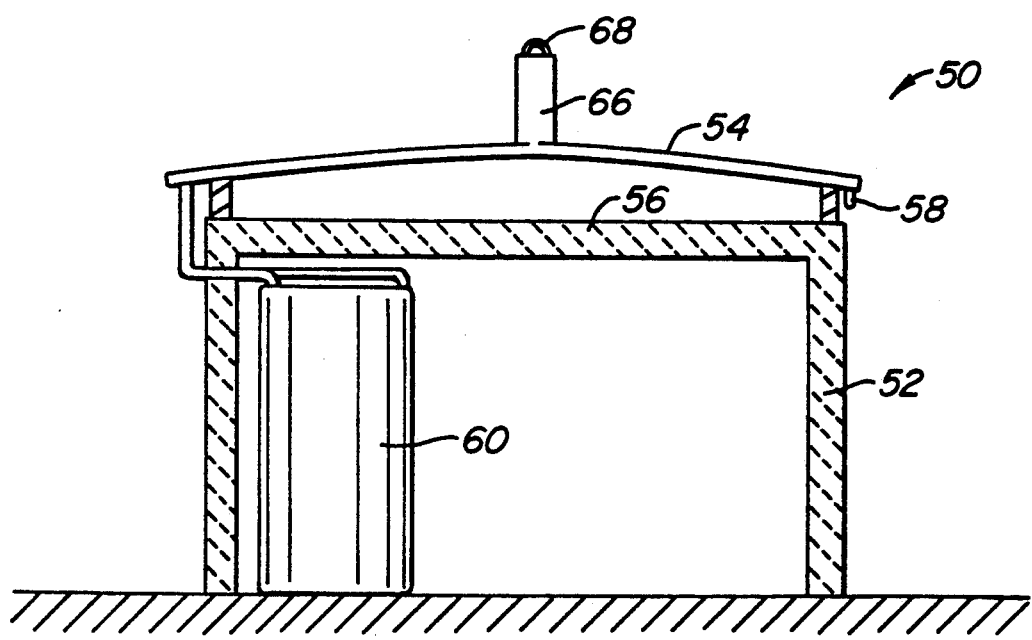
FIG. 3 is a sectional schematic view of a second embodiment of the passive cooling system of the present invention.
Figure 4:
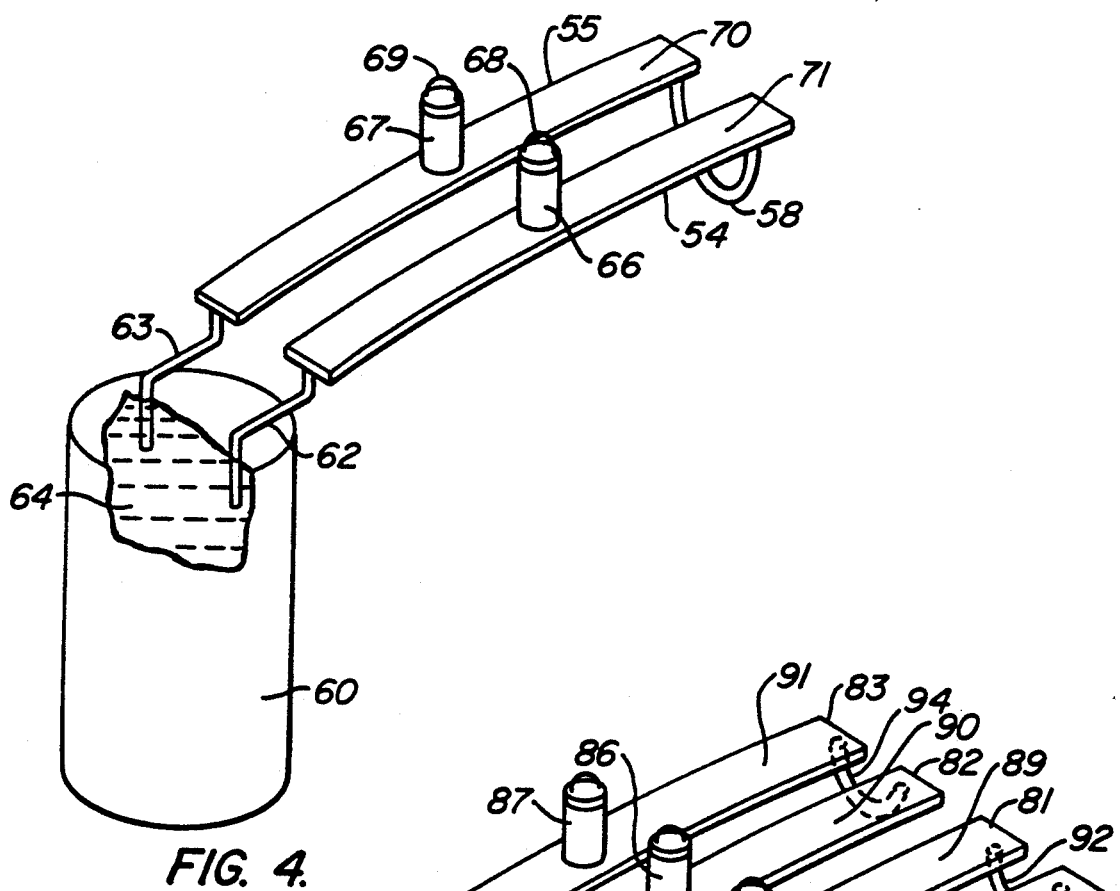
FIG. 4 is a schematic view of the second embodiment.

The second embodiment 50 of the present invention is illustrated in FIGS. 3 and 4. Embodiment 50 is designed to be utilized with an existing structure 52, typically larger than the box 12 of the first embodiment. Embodiment 50 includes a pair of elongate radiator elements 54, 55 spanning the upper surface 56 of enclosure 52. A conduit 58 interconnects the far ends of radiator elements 54, 55 together so that water can flow between them. A water container 60 sufficiently rigid to hold its shape but flexible enough to allow the water to expand upon freezing is located within enclosure 52. A pair of conduits 62, 63 extend from adjacent ends of radiator elements 54, 55 to within water container 60 so that the ends of conduit 62, 63 project slightly into the water 64 in container 60 at spaced-apart locations.

Each radiator element 54, 55 is slightly bowed, and includes a discrete expansion tank 66, 67 at its high point in the center. Each expansion tank 66, 67 includes a port 68, 69 which can be utilized to fill the associated radiator element and the system with water. Expansion tanks 66, 67 provide a reservoir of water so that the radiator elements and the remainder of the system remains filled with water at all times, and also allows for expansion in the event of freezing without failure of the system.

The principles of operation of the second embodiment of the present invention are essentially the same as the first embodiment. Each radiator element 54, 55 has an upper radiating surface 70, 71 to cool the water in the radiator when surfaces 70, 71 are exposed to the night sky. When the water 64 in water container 60 has a temperature of greater than 45°, and is warmer than the water within radiator elements 54, 55, the relatively warm water at the upper end of water container 62 will exert an upward pressure through conduits 62, 63. At the onset of thermosyponing, one or the other of the conduits will have a stronger upward pressure than the other due to local effects, and the water will flow upwardly slightly and this effect will begin a strengthening cycle of flow up through that conduit and downwardly through the other. The relatively warm water 64 from water container 60 will flow through one of the radiator elements 54, 55, through interconnecting conduit 58, back through the other conduit, and return to water container 60.

As the water flows through radiator elements 54, 55, it will be cooled so that relatively cooler water is returned to water container 60. The relatively cooler water will plunge toward the bottom of water container 60, and as the process continues, the overall temperature of the water 64 in water container 60 will be reduced. Conversely, when the water 64 in container 60 is more dense than water in radiators 54 and 55, no circulation occurs. Above 39° F. (4° C.) this is equivalent to water 64 being colder than water in 54 and 55. However, water below 39° F. is less dense and can stop 45° F. water in container 60 from circulating and if both contairns and radiator are below 39° F. heat sinks instead of rising. As in the first embodiment, the non-circulating water 64 in container 60 inhibits excessive unwanted cooling within enclosure 62.

Figure 5:
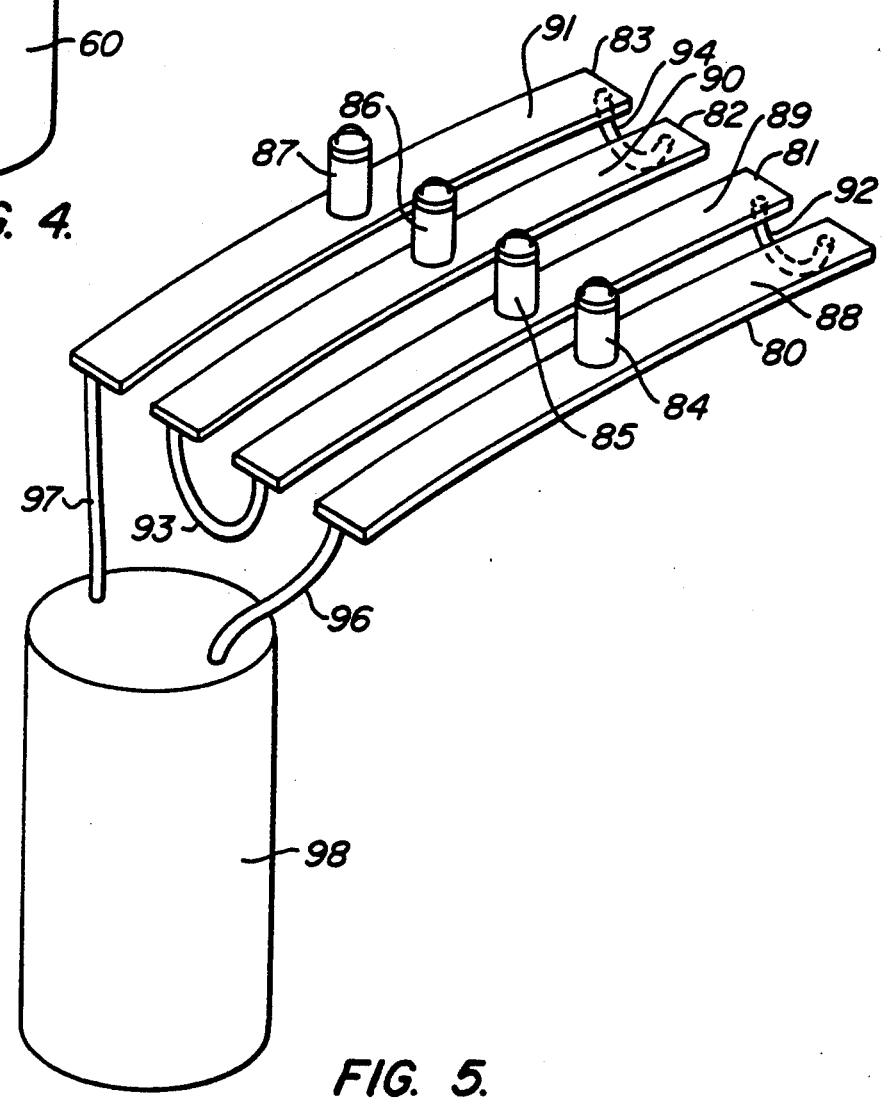
FIG. 5 is a schematic view similar to that of FIG. 4 showing an alternative form of the radiator configuration of the second embodiment.

The second embodiment may be extended as illustrated in FIG. 5 to improve the radiant cooling of the water as it passes through the radiator elements. In the embodiment illustrated in FIG. 5, four parallel radiator elements 80–83 are employed. Each radiator element 88–83 is bound with a high point in the center and has its own discrete expansion tank 84–87. The upper surface 88–91 of each radiator element 80–83 provides a radiating surface through which heat can be dissipated to the night sky.

Conduits 92, 93 and 94 interconnect the various ends of the radiator elements 80–83 to provide a fluid path in which the water flows sequentially through each radiator element in series from end to end, maximizing the exposure of the water within the radiator elements to the radiating surfaces 88–91. A pair of parallel conduits 96, 97 extend from the opposite ends of the series of radiator elements 80, 83 to a water container 98, similar to the water container 60 in the second embodiment. In this configuration, the system of FIG. 5 will operate identically to that shown in FIGS. 3 and 4, except that the cooling capacity is enhanced by the use of additional radiator elements.

The operation of the second embodiment of the present invention, including the adaptation of FIG. 5, is sensitive to the configuration of fins 54, 55, and 80–83. Fins which are 7½ inches wide and ½ inch deep, together with a 1½ inch inner diameter hose, have been found acceptable. In this configuration, the fins were located approximately 5 feet above the top of the water container and the total aggregate length of the fins and conduit is 40 feet and 20 feet respectively.

While preferred embodiments of the present invention have been illustrated by way of example, it is apparent that modifications and adaptations of those embodiments will occur to those skilled in the art. It is to be expressly understood that such adaptations and modifications are within the spirit and scope of the present invention, as set forth in the following claims.

What is claimed is:

1. Apparatus for controlling the internal temperature of an enclosure utilizing a quantity of water, said apparatus comprising:
   a water container located inside the enclosure and having an upper end;
   a generally flat hollow radiator having a generally horizontal configuration proximate and exterior to the enclosure above the level of the upper end of the water container, said radiator having an exposed upper surface adapted to radiate heat into the atmosphere;
   a pair of conduits symmetrically arranged for providing a pair of water flow paths from spaced-apart container entry/exit positions proximate the upper end of said water container to spaced apart radiator entry/exit positions in the radiator so that heat will be dissipated from the interior of the enclosure, if the water temperature in the container is above about 45 degrees Fahrenheit and is sufficiently warm relative to the temperature of the water in the radiator, by the relatively warm water in the container circulating upwardly from the upper end of the container through one of the conduits to one of the entry/exit positions in the radiator, through the radiator to the other radiator entry/exit position during which the water is cooled by dissipating heat into the atmosphere, and downwardly through the other conduit to the container in which the relatively cooler water temperature from the radiator sinks to the bottom to cool the interior of the housing, the circulation of water through the conduits and the radiator substantially ceasing when the water temperature is below about 45 degrees Fahrenheit and when the temperature of the water in the radiator is warmer than the temperature of the water in the container.

2. The apparatus of claim 1 wherein the enclosure comprises a substantially fully enclosed housing having a hollow interior cavity.

3. The apparatus of claim 2 wherein the housing is insulated.

4. The apparatus of claim 2 wherein the radiator is integral with the upper surface of the housing.

5. The apparatus of claim 1 wherein the radiator comprises a pair of spaced apart flat plates sealed together around their periphery.

6. The apparatus of claim 1 wherein the conduit through which the water flows from the container to the radiator and the conduit through which the water flows from the radiator to the container is randomly selected by the apparatus and determined by factors such as eddy currents and localized heating.

7. The apparatus of claim 1 wherein the radiator is inclined from horizontal so that the radiator has a high end and a low end, the radiator entry/exit positions being at opposite sides of said low end of the radiator.

8. The apparatus of claim 1 wherein the radiator comprises at least 2 parallel elongate elements interconnected at one end to provide a water flow path between them, the spaced apart radiator entry/exit positions being located at the other ends of the respective elongate elements so that water circulating through the radiator passes lengthwise through one then the other of the radiator elements.

9. The apparatus of claim 8 wherein the elongate elements are spaced above the upper surface of the enclosure.

10. The apparatus of claim 8 wherein the radiator comprises 4 parallel elongate elements interconnected in series with respective radiator entry/exit positions being at opposite ends of the series.

11. The apparatus of claim 8 wherein the elongate elements are bowed to provide a high point intermediate their ends, and wherein each element has a discrete expansion tank at its high point so that the elements remain filled with water.

12. The apparatus of claim 1 wherein the water container comprises the interior surfaces of the enclosure.

13. The apparatus of claim 1 wherein the water container is flexible, and is maintained in intimate contact with temperature-sensitive equipment located within the enclosure.

14. The apparatus of claim 1 wherein the water container comprises a discrete generally rigid container spaced from temperature-sensitive equipment located within the enclosure.

15. Apparatus for controlling temperature utilizing a quantity of water, said apparatus comprising:
a substantially fully enclosed housing having a hollow interior cavity;
a water container located inside the hollow interior cavity of the housing and having an upper end;
a generally flat hollow radiator having a generally horizontal configuration proximate and exterior to the housing above the level of the upper end of the water container, said radiator having an exposed upper surface adapted to radiate heat into the atmosphere;
a pair of conduits symmetrically arranged for providing a pair of water flow paths from spaced-apart container entry/exit positions proximate the upper end of said water container to spaced apart radiator entry/exit positions in the radiator so that heat will be dissipated from the interior of the enclosure,
if the water temperature in the container is above about 45 degrees Fahrenheit and is sufficiently warm relative to the temperature of the water in the radiator, by the relatively warm water in the container circulating upwardly from the upper end of the container through one of the conduits to one of the entry/exit positions in the radiator, through the radiator to the other radiator entry/exit position during which the water is cooled by dissipating heat into the atmosphere, and downwardly through the other conduit to the container in which the relatively cooler water returning from the radiator sinks to the bottom to cool the interior of the housing, the circulation of water through the conduits and the radiator substantially ceasing when the water temperature is below about 45 degrees Fahrenheit and when the temperature of the water in the radiator is warmer then the temperature of the water in the container.

16. Apparatus for controlling temperature utilizing a quantity of water, said apparatus comprising:
a substantially fully enclosed, insulated housing having a hollow interior cavity adapted to contain temperature-sensitive equipment and an upper portion including a flat hollow radiator slightly inclined to horizontal and having an exposed upper surface adapted to radiate heat into the atmosphere;
a flexible water container located inside the hollow interior cavity of the housing in intimate contact with the temperature-sensitive equipment and having an upper end;
a pair of conduits symmetrically arranged for providing a pair of water flow paths from spaced-apart container entry/exit positions proximate the upper end of said water container to spaced apart radiator entry/exit positions at opposite sides of a low end of the radiator so that heat will be dissipated from the interior of the enclosure, if the water temperature in the container is above about 45 degrees Fahrenheit and is sufficiently warm relative to the temperature of the water in the radiator, by the relatively warm water in the container circulating upwardly from the upper end of the container through one of the conduits to one of the entry/exit positions in the radiator, through the radiator to the other radiator entry/exit position during which the water is cooled by dissipating heat into the atmosphere, and downwardly through the other conduit to the container in which the relatively cooler water returning from the radiator sinks to the bottom to cool the interior of the housing, the circulation of water through the conduits and the radiator substantially ceasing when the water temperature is below about 45 degrees Fahrenheit and when the temperature of the water in the radiator is warmer than the temperature of the water in the container.

17. The apparatus of claim 16 wherein the radiator comprises a pair of spaced apart flat plates sealed together around their periphery.

18. The apparatus of claim 16 wherein the water container comprises the interior surfaces of the housing.

19. The apparatus of claim 16 wherein the water container is flexible, and is maintained in intimate contact with the temperature-sensitive equipment.

20. Apparatus for controlling the internal temperature of an enclosure utilizing a quantity of water, said apparatus comprising:
   a water container located inside the enclosure and having an upper end;
   a generally flat hollow radiator proximate and exterior to the enclosure above the level of the upper end of the water container, said radiator having at least two elongate, generally horizontal elements each having an exposed upper surface adapted to radiate heat into the atmosphere, said elements being interconnected at one end to provide a water flow path between them and having radiator entry/exit positions located at their other ends;
   a pair of conduits symmetrically arranged for providing a pair of water flow paths from spaced-apart container entry/exit positions proximate the upper end of said water container to spaced apart radiator entry/exit positions in the radiator so that heat will be dissipated from the interior of the enclosure, if the water temperature in the container is above about 45 degrees Fahrenheit and is sufficiently warm relative to the temperature of the water is the radiator, by the relatively warm water in the container circulating upwardly from the upper end of the container through one of the conduits to one of the entry/exit positions in the radiator, through the radiator to the other radiator entry/exit position during which the water is cooled by dissipating heat into the atmosphere, and downwardly through the other conduit to the container in which the relatively cooler water returning from the radiator sinks to the bottom to cool the interior of the housing, the circulation of water through the conduits and the radiator substantially casing when the water temperature is below about 45 degrees Fahrenheit and when the temperature of the water in the radiator is warmer than the temperature of the water in the container.

21. The apparatus of claim 20 wherein the elongate elements are spaced above the upper surface of the housing.

22. The apparatus of claim 20 wherein the radiator comprises 4 parallel elongate elements interconnected in series with respective radiator entry/exit positions being at opposite ends of the series.

23. The apparatus of claim 20 wherein the elongate elements are bowed to provide a high point intermediate their ends, and wherein each element has a discrete expansion tank at its high point so that each element remains filled with water.

* * * * *